United States Patent [19]
Henkes

[11] 4,340,275
[45] Jul. 20, 1982

[54] REAR PROJECTION SCREEN WITH PATTERNED LENTICULAR PRISMATIC STRUCTURE

[75] Inventor: John L. Henkes, Latham, N.Y.

[73] Assignee: General Electric Company, Portsmouth, Va.

[21] Appl. No.: 158,026

[22] Filed: Jun. 9, 1980

[51] Int. Cl.³ .............................................. G03B 21/62
[52] U.S. Cl. ..................................... 350/128; 350/167
[58] Field of Search ................ 350/122, 127, 128, 167

[56] References Cited

U.S. PATENT DOCUMENTS

| | | | |
|---|---|---|---|
| 1,666,808 | 4/1928 | Buchner | 350/128 |
| 2,268,351 | 12/1941 | Tanaka | 350/128 |
| 3,781,091 | 12/1973 | Ferguson | 350/167 |
| 4,012,115 | 3/1977 | Brown | 350/167 |
| 4,147,408 | 4/1979 | Plummer | 350/128 |

Primary Examiner—L. T. Hix
Assistant Examiner—Alan Mathews

[57] ABSTRACT

A rear projection screen having a patterned lenticular prismatic structure formed on the front side for providing an asymmetrical viewing field of a substantially wider viewing angle in the horizontal direction than in the vertical direction, throughout which are achieved superior optical properties particularly in terms of light uniformity and light efficiency. A surface pattern in the form of tiny lenslets formed through a reliable etch process contributes a high gain factor diffusion to the projected light which coacts with optical characteristics of the prism configuration.

6 Claims, 7 Drawing Figures

REAR PROJECTION SCREEN WITH PATTERNED LENTICULAR PRISMATIC STRUCTURE

BACKGROUND OF THE INVENTION

The invention pertains generally to rear projection screens and, more specifically, to rear projection screens useful in display equipment for providing light transmission over a widened viewing angle.

The advent of large screen projection television systems has been accompanied by an increasing interest to improve the optical properties of rear projection screens with respect to providing a high resolution, high gain, uniform intensity distribution of light over a horizontally widened viewing angle, with good ambient light rejection and minimal hot spot formation at the center of the screen. Numerous screen designs have been developed in an effort to optimize these properties, including various surface and bulk treatments of the screen employed separately and in different combinations. Surface treatment has included (1) embossing the screen surface with lens elements of various configurations for light refraction and diffusion, and also for light focusing; and (2) applying one of several light diffusing coatings to the screen surface, e.g., a powdered inorganic material in an organic binder. Bulk treatment has included the employment of (1) a light diffusing semi-transparent solid material, such as a natural or synthetic wax, fabricated as a sheet or plate; and (2) a crystalline polymer material fabricated as a sheet or plate. While screen designs of the prior art have met with varying degrees of success in the achievement of the sought after optical performance, none is found to be entirely adequate, particularly when limited projection light is available. Further, all of the relatively good performing screens are found to be quite costly to manufacture.

SUMMARY OF THE INVENTION

It is accordingly an object of the invention to provide a novel and improved rear projection screen that exhibits superior optical properties in terms of light efficiency and light uniformity, as well as resolution and ambient light rejection over wide viewing angles.

It is another object of the invention to provide a novel and improved rear projection screen for display equipment that provides excellent optical performance for limited projection light.

It is a further object of the invention to provide a novel and improved rear projection screen as above described that lends itself to an economical and reproducible manufacture.

It is yet another object of the invention to provide a novel and improved rear projection screen as above described that can be manufactured with good mechanical strength.

These and other objects of the invention are accomplished by a rear projection screen comprising a relatively thin translucent plastic sheet member having an output surface on which are contoured a series of vertically arranged prismatic lenticules sufficiently closely spaced in the horizontal direction so that their structure is not resolvable by the naked eye at normal viewing distances. Said prismatic lenticules each include a flat surface portion and two adjacent inclined surfaces which form an obtuse angle with respect to each other that is in a range extending from about 100° to 140°. The prismatically contoured output surface contain uniformly arranged light diffusing lenslets that provide a relatively high brightness gain diffusion of the transmitted light and coact with said prismatic lenticules to provide an asymmetrical viewing field of superior optical properties.

The prismatically contoured output surface is fabricated by forming parallel lines of prismatic elements on one surface of a die sheet preferably of an aluminum alloy using a prism shaped cutting tool, immersing said die sheet in an etching solution of sodium hydroxide so as to form on the surface of the prismatic elements an etched pattern corresponding to said light diffusing lenslets, and press molding the etched prismatic surface of said die sheet into the plastic sheet member material when in an initial undeformed state.

BRIEF DESCRIPTION OF THE DRAWINGS

While the specification concludes with the claims which particularly point out and distinctly claim that subject matter which is regarded as inventive, it is believed the invention will be more clearly understood when considering the following detailed description taken in connection with the accompanying figures of the drawings, in which:

DESCRIPTION OF THE PREFERRED EMBODIMENT

Figure 1:
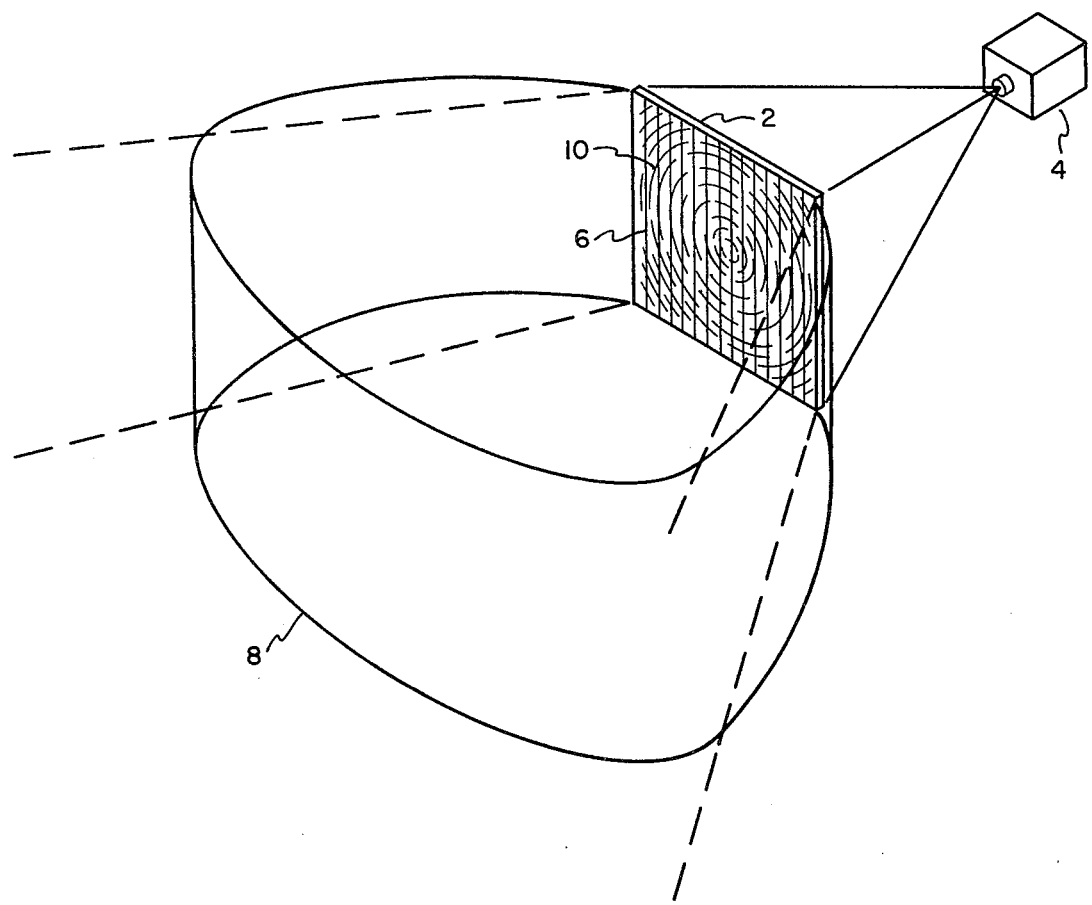
FIG. 1 is a perspective view of a light projection system employing the rear projection screen of the present invention.

Referring to FIG. 1, there is illustrated in perspective view a light projection system employing a rear projection screen 2 of novel construction that provides excellent optical performance over wide viewing angles, can be reliably reproduced on a mass production basis and possesses good mechanical strength.

A light projector 4, which may be a movie, slide or television projector, or the like, forms an image that is projected to substantially cover the back side or input surface of the rear projection screen. When considering a television system, the light projector may comprise a conventional television picture tube, chassis and projection lens component. The screen 2 is composed of a conventional translucent plastic material, being a one-piece acrylic in the present embodiment of the invention which efficiently transmits incident light. Typical screen dimensions are several feet on each side, with a thickness of 0.025 to 0.250 inches.

The front side or output surface of the screen is embossed with a patterned lenticular prismatic structure, in accordance with the invention, illustrated by the solid lines 6, which forms an asymmetrical viewing field 8 exhibiting an appreciably wider viewing angle in the horizontal direction than in the vertical direction. The novel construction of the prismatic structure, subsequently described in detail, provides superior optical properties over the entire viewing field in terms of light uniformity, light efficiency and ambient light rejection, as well as resolution. The present screen design has been found to achieve the noted optical properties throughout a viewing field that extends in the horizontal direction in excess of 20° to either side of the projection axis up to limits at half power light intensity.

The input surface of the screen 2 is embossed with a conventional Fresnel lens, illustrated by the dashed circular lines 10, which contributes to providing a uniform light distribution throughout the projected image. However, for purposes of the invention, the Fresnel lens need not be integrally constructed with the screen but may be a separate lens component.

Figure 2:
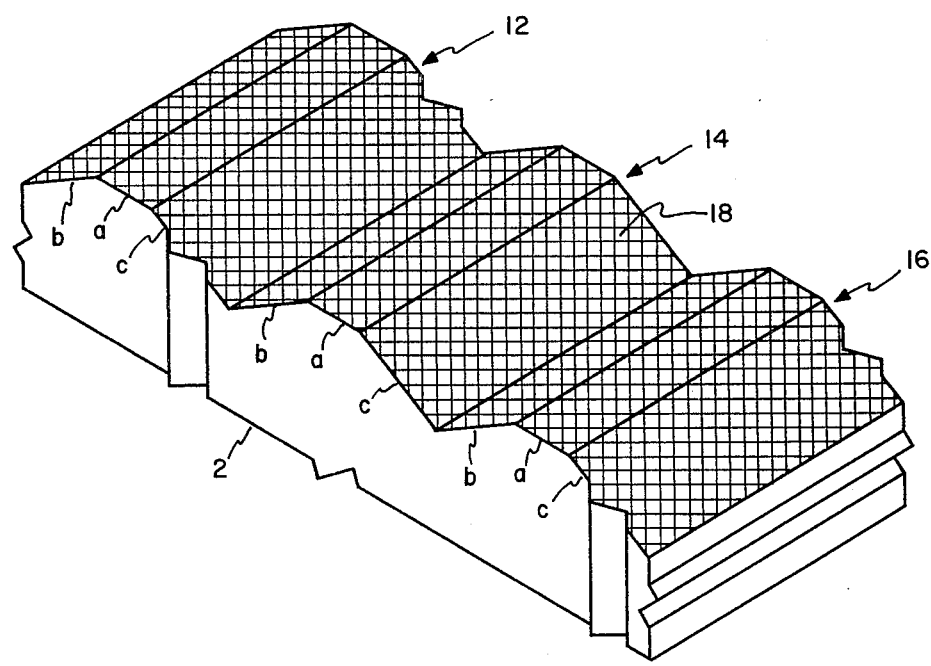
FIG. 2 is a perspective view of a portion of the inventive rear projection screen.

In FIG. 2 is illustrated in greatly magnified perspective view a portion of the screen 2 covering a fraction of an inch of surface area, as viewed from the front side. Included are three partial prismatic lenticules 12, 14 and 16 each with a flat surface a and two adjacent inclined surfaces b and c. The prismatic lenticules, arranged in columns, are located on centers sufficiently closely spaced so as not to be resolvable to the naked eye at normal viewing distances. The prismatic configuration serves to spread the projected light in one direction, namely in the horizontal direction. The surface of the front side is patterned through an etch process, to be described with respect to FIGS. 4 through 7, in the form of tiny lenslets 18 which provide diffusion of the projected light with a relatively high brightness gain factor. Brightness gain factor is defined as the ratio of screen brightness to that of a perfect Lambert law diffuser measured goniophotometrically, i.e., as a function of spread angle. As will be further discussed when considering the goniophotometric curves of FIG. 3, the light refracting properties of the prismatic lenticules and the light diffusing properties of the patterned lenslets are combined to provide an optimized light intensity and light uniformity over a horizontally widened viewing field. In addition, these properties provide a high degree of ambient light rejection.

Figure 3:
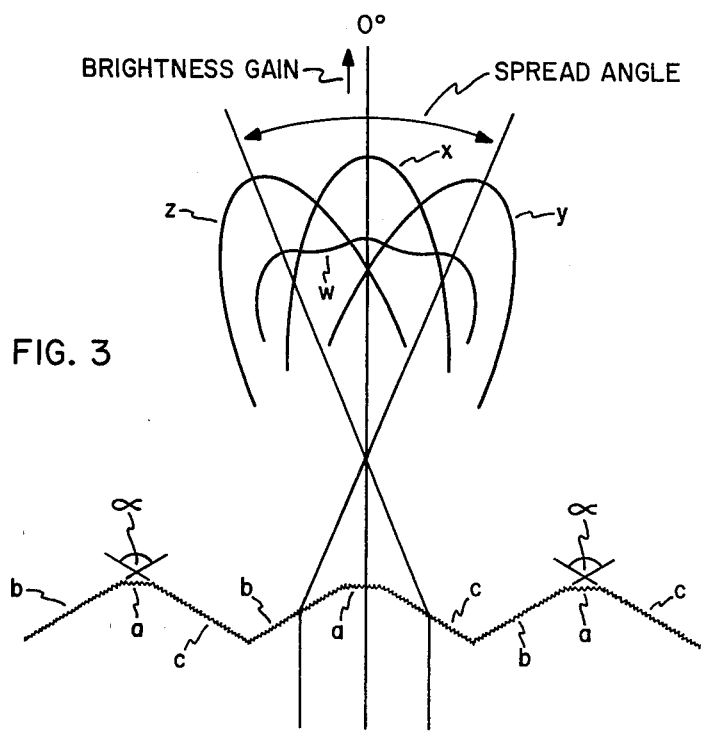
FIG. 3 is a set of goniophotometric curves of the directional light distribution for the inventive rear projection screen.

In FIG. 3 are a set of typical goniophotometric curves for light transmitted through the screen 2. These curves illustrate the brightness gain factor in the horizontal direction of the transmitted light. The set of goniophotometric curves, which are in polar form, are shown to include individual curves x, y and z and a resultant curve w. Curve x, which corresponds to light from the flat surface a of the prism, is referenced to the 0° projection axis. The angular offset from the 0° projection axis of the individual curves y and z, which curves correspond to light from the two adjacent inclined surfaces b and c, respectively, is a function of the angle α that surfaces b and c form with respect to each other. It may be appreciated that the angular offset is inversely related to the angle α. In operation, the individual curves represent an on axis brightness gain g of between 20 to 35, dropping abruptly to the half power point within a narrow angle of several degrees for off axis light. The resultant curve w represents a relatively uniform brightness gain over the widened horizontal angle of about ⅓ the on axis gain g of the individual curves. The relatively high gain factor of the individual goniophotometric curves is determined primarily by the degree of etching of the front surface of the screen. The light diffusing characteristic of the etched surface are symmetrical in all directions so that the individual curves x, y, z would appear with the same configuration but at reduced gain factor for angles in the vertical direction. By employing an etched surface providing a high brightness gain factor, light projected through the screen is confined within a relatively narrow angle in the vertical direction, with correspondingly more light available for spread in the horizontal direction which contributes to a heightened brightness and efficiency of the projected image in this direction.

The high brightness gain light diffusing characteristics of the etched surface are superimposed on the optical characteristics of the prism configuration, which configuration as noted effects only a horizontal spread of the projected light, to provide the resultant goniophotometric curve w in the horizontal direction. Also contributing to the shape of the resultant curve w is the ratio r of the area of the flat surface a of the prism to the combined area of the two adjacent inclined surfaces b and c. Optimizing the projected light uniformity and intensity over a given horizontal viewing angle is based upon a trade-off of the three factors discussed above, namely: (1) the brightness gain factor provided by the surface etch; (2) the angle α between the inclined surfaces b and c of the prism; and (3) the ratio r of the area of the flat surface a to the inclined surfaces. It has been found that in achieving the objectives of the invention within these trade-offs, the on axis brightness gain g can be varied from about 20 to 35; the angle α can extend from about 100° to 140°; and the ratio r can extend from about 1/10 to ½. In one exemplary embodiment of the invention the on axis brightness gain g was about 22; an angle α of 116° was employed; the prismatic elements were on centers spaced by 0.020 inches; the flat surfaces a had a width of 0.0028 inches and the inclined surfaces b and c each had a width of 0.0102 inches; the depth of the prismatic elements from the flat surface peak to the trough was 0.0054 inches, providing a ratio r of approximately 1/7; and the screen thickness was 0.120 inches.

The screen 2 is of a one-piece construction that can be manufactured with good mechanical strength and consistently close tolerances for the lenticular prism dimensions and the light diffusing lenslets through the fabrication process illustrated in FIGS. 4 through 7. In general, the patterned lenticular prismatic structure on the output surface of the screen is formed by a uniquely constructed prism embossing die.

Figure 4:
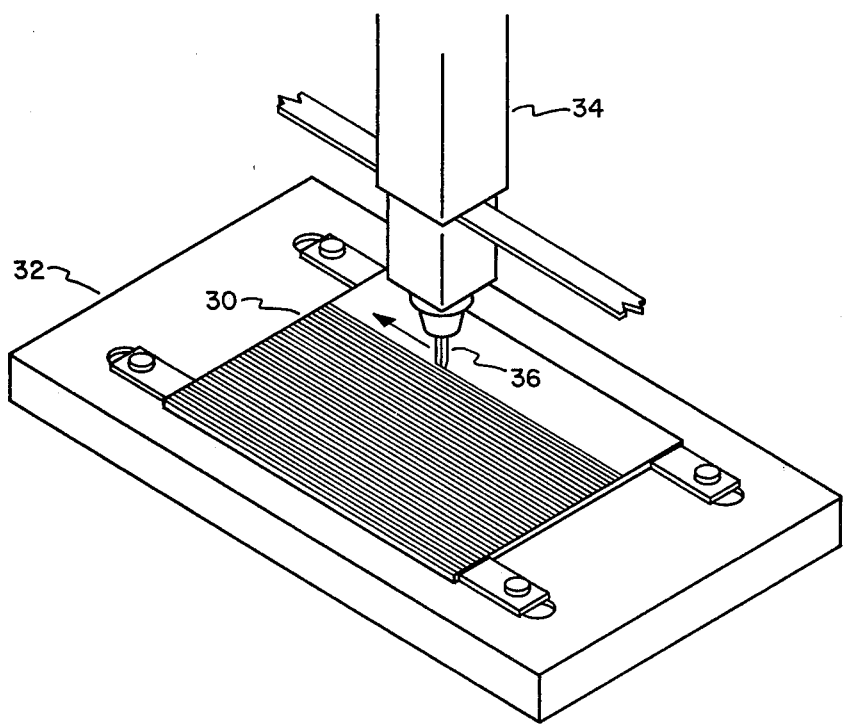
FIG. 4 is a schematic diagram of die cutting apparatus employed in fabricating the inventive rear projection screen.

The embossing die is preferably fabricated from an aluminum alloy material which as schematically shown in FIG. 4 is in the form of a sheet 30 secured to the bed 32 of a kind of milling machine 34 and cut with a cutting tool 36 that forms parallel lines of prismatic elements over substantially the entire surface of the aluminum alloy sheet. Cuts are made in a single direction along the sheet surface, shown by the arrow. The machine may operate to move the cutting tool in this direction from one side of the sheet to the opposite side for making a cut, returning the tool to the first side free of the surface, and stepping the tool in the orthogonal direction for making subsequent cuts. The die material must be one that is subject to a reliable etching process for readily forming the patterned lenslets with consistent light diffusing properties. A 6061-T6 aluminum alloy has been found to be a particularly good material for this purpose. The aluminum sheet is approximately the same length and width dimensions of the screen and about 0.020 to 0.030 inches thick. The cutting tool 36 has a diamond cutting point which is contoured in accordance with the dimensions of the prism lenticules to be formed on the screen. Thus, at the completion of this step in the fabrication process the die 30 is provided on one side with parallel lines or columns of prismatic elements the surfaces of which are optically smooth.

Figure 5:
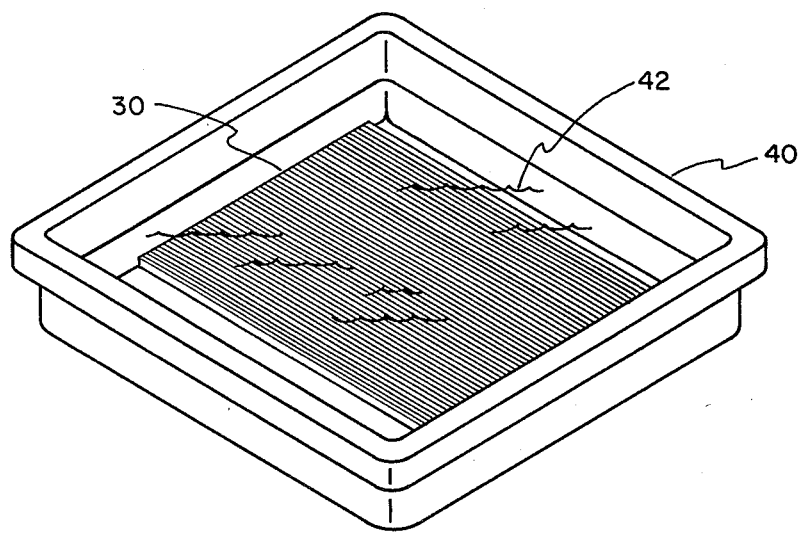
FIG. 5 is a schematic diagram of etch apparatus employed in fabricating the inventive rear projection screen.
Figure 6:
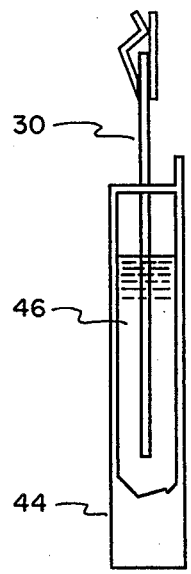
FIG. 6 is a schematic diagram of rinse apparatus employed in fabricating the inventive rear projection screen.

In accordance with an exemplary etch process of the invention, the die 30 is then thoroughly cleaned with a commercial detergent at about 110° F. and rinsed thoroughly with deionized water for about one minute. After this, the die is immersed horizontally, prism side up, into a tank 40 containing a sodium hydroxide etch solution 42, as shown in FIG. 5. The die remains immersed in the etch bath for about 45 minutes and is then rinsed thoroughly with deionized water for approximately 10 seconds. The die is then immersed vertically into a rinse tank 44 containing a nitric acid rinse solution 46, as shown in FIG. 6, for another approximately 10 second period. A final rinse with deionized water for approximately one minute is then performed. The die is then dried with a hot air gun about four minutes.

Figure 7:
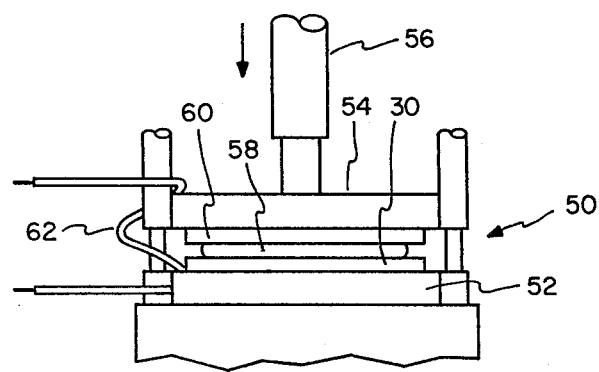
FIG. 7 is a schematic diagram of embossing apparatus employed in fabricating the inventive rear projection screen.

At the completion of this step of the process an etched pattern corresponding to the light diffusing lenslets has been formed on the surface of the prismatic elements of the prism die 30 which is now ready to emboss the screen material. A press molding jig 50 is schematically illustrated in FIG. 7 to include a stationary lower platen 52, a movable upper platen 54 and a piston 56 for driving the upper platen toward the lower platen. A sandwich arrangement of the prism embossing die 30, a plastic sheet 58 of the screen material and a Fresnel embossing die 60 is provided between the platens. The prism die 30 is supported by the lower platen with the etched prismatic surface toward the plastic. The Fresnel die, which is a conventional component, overlays the plastic sheet with the Fresnel side toward the plastic. Accordingly under pressure of the piston driven platens and heat supplied by heater wires 62, the prism die and Fresnel die press mold their respective patterns into the surface of the plastic sheet to form a completed rear projection screen.

Although the invention has been described with reference to specific embodiments thereof, it may be appreciated that numerous modifications can be made to the novel structure herein disclosed which would not exceed the basic teachings set forth. For instance, the prism configuration could be of the type having a flat surface at the trough in addition to the peaks of each lenticule, operating within the same comstraints as given with respect to the illustrated structure. In addition, the screen material may contain bulk diffusion properties that further modify the brightness gain factor. Accordingly, the following claims are to be construed as including within their ambit the above and all modifications and alternatives of the disclosed structure and its fabrication that fall within the true scope of the invention.

What I claim as new and desire to secure as Letters Patent of the United States is:

1. A rear projection screen for transmitting incident light from a projector so as to provide viewing angles that are substantially greater in the horizontal direction than in the vertical direction, comprising:
   (a) a relatively thin translucent plastic sheet member having an output surface on which are contoured a series of vertical prismatic lenticules sufficiently closely spaced in the horizontal direction so that their structure is not resolvable by the naked eye at normal viewing distances,
   (b) said prismatic lenticules each including a flat surface portion and two adjacent inclined surfaces, said inclined surfaces forming an obtuse angle with respect to each other,
   (c) the prismatically contoured output surface containing uniformly arranged light diffusing lenslets that provide a relatively high brightness gain diffusion of the transmitted light, said light diffusing lenslets coacting with said prismatic lenticules to provide an asymmetrical viewing field of superior optical properties.

2. A rear projection screen as in claim 1 wherein said obtuse angle is in a range extending from about 100° to 140°.

3. A rear projection screen as in claim 2 in which said light diffusing lenslets provide an on axis brightness gain factor for projecting light of about 20 to 35 and wherein the ratio of the area of said flat surface portion to the combined area of said inclined surfaces is between about 1/10 and $\frac{1}{2}$.

4. A rear projection screen as in claim 3 wherein said obtuse angle is about 116° and the ratio of the area of said flat surface portion to the combined area of said inclined surfaces is about 1/7.

5. A rear projection screen for transmitting incident light from a projector so as to provide viewing angles that are substantially greater in the horizontal direction than in the vertical direction, comprising:
   (a) a relatively thin translucent plastic sheet member having an output surface on which are contoured a series of vertical prismatic lenticules sufficiently closely spaced in the horizontal direction so that their structure is not resolvable by the naked eye at normal viewing distances,
   (b) said prismatic lenticules each including a flat surface portion and two adjacent inclined surfaces, said inclined surfaces forming an obtuse angle with respect to each other,
   (c) the prismatically contoured output surface containing uniformly arranged light diffusing lenslets that provide a relatively high gain diffusion of the transmitted light and which coact with said prismatic lenticules to provide an asymmetrical viewing field of superior optical properties,
   (d) the prismatically contoured output surface including said light diffusing lenslets having been fabricated by uniformly etching a pattern into the surface of a die containing parallel lines of prismatic elements, which pattern corresponds to said light diffusing lenslets, and press molding the etched surface of said die into the plastic sheet member material when in an initial undeformed state.

6. A rear projection screen for transmitting incident light from a projector so as to provide viewing angles that are substantially greater in the horizontal direction than in the vertical direction, comprising:
   (a) a relatively thin translucent plastic sheet member having an output surface on which are contoured a series of vertical prismatic lenticules sufficiently closely spaced in the horizontal direction so that their structure is not resolvable by the naked eye at normal viewing distances,
   (b) said prismatic lenticules each including a flat surface portion and two adjacent inclined surfaces, said inclined surfaces forming an obtuse angle with respect to each other, (c) the prismatically contoured output surface containing uniformly arranged light diffusing lenslets that provide a relatively high gain diffusion of the transmitted light and which coact with said prismatic lenticules to provide an asymmetrical viewing field of superior optical properties, (d) the prismatically contoured output surface including said light diffusing lenslets having been fabricated by forming parallel lines of prismatic elements on one surface of a die sheet composed of an aluminum alloy using a prism shaped cutting tool, immersing said die sheet in an etching solution of sodium hydroxide so as to form on the surface of the prismatic elements an etched pattern corresponding to said light diffusing lenslets, and press molding the etching prismatic surface of said die sheet into the plastic sheet member material when in an initial undeformed state.

* * * * *